United States Patent
Yoneyama et al.

(12) 
(10) Patent No.: US 6,309,089 B1
(45) Date of Patent: Oct. 30, 2001

(54) VEHICLE LAMP WITH DISCHARGE BULB, ELECTRICALLY-CONDUCTIVE COVER, AND REFLECTOR HAVING ELECTRICALLY-CONDUCTIVE FILM ON REFLECTOR SURFACE

(75) Inventors: Masatoshi Yoneyama; Hironori Tsukamoto; Toru Nakayama, all of Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/511,272

(22) Filed: Feb. 23, 2000

(30) Foreign Application Priority Data

Feb. 23, 1999 (JP) .................................................. 11-045396

(51) Int. Cl.[7] .................................................. F21K 27/00
(52) U.S. Cl. ........................ 362/263; 362/546; 362/265; 362/516
(58) Field of Search .................................... 362/263, 546, 362/265, 516, 293

(56) References Cited

U.S. PATENT DOCUMENTS

| | | | |
|---|---|---|---|
| 5,343,370 | * | 8/1994 | Ohashi et al. ........................ 362/549 |
| 5,607,228 | * | 3/1997 | Ozaki et al. .......................... 362/263 |
| 5,879,073 | | 3/1999 | Hori et al. ............................ 362/344 |
| 5,895,113 | * | 4/1999 | Ozaki et al. .......................... 362/546 |
| 6,176,604 | * | 1/2001 | Dubrovin et al. .................... 362/539 |

FOREIGN PATENT DOCUMENTS

| | | | |
|---|---|---|---|
| 0 860 655 A2 | 8/1998 | (EP) | ................. F21V/25/00 |
| 0 898 113 A1 | 2/1999 | (EP) | ................. F21M/3/10 |
| 0 905 441 A1 | 3/1999 | (EP) | ................. F21V/25/00 |
| 2 308 649 A | 7/1997 | (GB) | ................. F21M/3/00 |
| WO 00/17570 | 3/2000 | (WO) | ................. F21M/3/10 |

* cited by examiner

Primary Examiner—Sandra O'Shea
Assistant Examiner—Ronald E. DelGizzi
(74) Attorney, Agent, or Firm—Sughrue, Mion, Zinn, Macpeak & Seas, PLLC

(57) ABSTRACT

A vehicle lamp comprising a reflector, a discharge bulb, a connector, and a electrically-conductive cover. The reflector includes an electrically-conductive film on a surface of the reflector and a contact terminal portion electrically connected to the electrically-conductive film. The discharge bulb is supported in the reflector. The connector is detachably connected to the discharge bulb, and the electrically-conductive cover covers the connector. In the vehicle lamp, the electrically-conductive cover is in contact with the contact terminal portion of the reflector when the connector is connected to the discharge bulb.

10 Claims, 7 Drawing Sheets

VEHICLE LAMP WITH DISCHARGE BULB, ELECTRICALLY-CONDUCTIVE COVER, AND REFLECTOR HAVING ELECTRICALLY-CONDUCTIVE FILM ON REFLECTOR SURFACE

BACKGROUND OF THE INVENTION

1. Field of the Invention

This invention relates to a vehicle lamp suitably used as a head lamp, and more particularly to a vehicle lamp using a discharge bulb as a light source in which the influence of electromagnetic waves is prevented.

2. Description of the Related Art

Recently, a study has been made to apply a discharge bulb, which is good in light-emitting efficiency, color rendering properties, and a long lifetime, as a head lamp for an automobile. However, in a lamp of this type, a high voltage is required for producing a discharge in a discharge bulb, and a lighting circuit need to be associated with the lamp in order to increase a voltage of a car-mount-type battery to a appropriate high voltage. In this lighting circuit, a high voltage is produced at its secondary side, and electromagnetic waves due to this high voltage are radiated to the exterior. The electromagnetic waves provide noises to affect various electronic equipment in an automobile, thus preventing the proper operation of these electronic equipment. For example, there is produced a so-called EMI trouble in which noises are produced in the radio or noises are included in a signal system in a microcomputer mounted on the automobile. Such electromagnetic waves are also produced in the discharge bulb supplied with the above high voltage, and the above-mentioned EMI trouble is caused by electromagnetic waves from the discharge bulb. Therefore, there has been proposed a construction in which a shield member is provided over an inner surface of a lamp body to cover the discharge bulb, or to cover the discharge bulb and a high-voltage connector connected thereto, or to cover the whole of the surrounding of a reflector with the discharge bulb, and the high-voltage connector. In this technique, the shield member suppresses the radiation of electromagnetic waves from the discharge bulb to its surroundings, so that the above EMI trouble can be dealt with.

In this conventional technique, in addition to the essential component parts of the lamp including the discharge bulb and high-voltage connector electrically connected thereto, the separate shield member for preventing the radiation of electromagnetic waves need to be prepared, and must be incorporated in the lamp, and this invites problems that the number of the component parts increases and that the time and labor required for the assembling operation increase. Moreover, the discharge bulb needs to be covered with the shield member and the reflector supporting the discharge bulb in an air-tight manner, and therefore there is required a connection structure for electronically connecting the shield member to the reflector. As a result, there are encountered problems that the construction of the lamp becomes complicated because of the provision of this connection structure and that the assembling operation is cumbersome. Since the position where the shield member and the reflector are electronically connected together is fixed, it is quite difficult to effect the electrical connection in a small space within the lamp body.

SUMMARY OF THE INVENTION

It is an object of the present invention to provide a vehicle lamp using a discharge bulb as a light source in which an electromagnetic wave-shielding effect is enhanced. Moreover, the number of component parts of the lamp is reduced, and the assembling operation is simplified.

According to the present invention, there is provided a vehicle lamp comprising a reflector, a discharge bulb, a connector, and an electrically-conductive cover. The reflector includes an electrically-conductive film on a surface of the reflector and a contact terminal portion electrically connected to the electrically-conductive film. The discharge bulb is supported in the reflector. The connector is detachably connected to the discharge bulb, and the electrically-conductive cover covers the connector. In the vehicle lamp, the electrically-conductive cover is in contact with the contact terminal portion of the reflector when the connector is connected to the discharge bulb.

In other words, according to the present invention, there is provided a vehicle lamp wherein a discharge bulb is supported in a reflector, and a connector for electrical connection to feeder terminals of the discharge bulb is detachably provided. In the vehicle lamp, a contact terminal portion, electrically connected to an electrically-conductive film formed on a surface of the reflector, is provided at that portion of the reflector to which the connector is to be mounted; and an electrically-conductive cover is mounted on the connector in a unitary manner to cover the same; and in a condition in which the connector is attached to the discharge bulb, the electrically-conductive cover is contacted with the contact terminal portion. For example, in a preferred form of the invention, the reflector has a bulb mounting hole, and the discharge bulb is inserted and supported in the bulb mounting hole, and a peripheral wall is formed on that portion of the reflector surrounding the bulb mounting hole, and the connector is attached to the discharge bulb at a region within the peripheral wall, and the contact terminal portion comprises a resilient electrically-conductive member for resilient contact with a surface of the electrically-conductive cover of the connector, and is provided on a portion of the peripheral wall. The connector can be attached to and detached from the discharge bulb by rotating the connector relative to the discharge bulb, and a plurality of contact portions are formed on the electrically-conductive cover of the connector, and are spaced from one another in a direction of rotation of the connector, and the contact terminal portion is contacted with one of the contact portions.

In the present invention, when the connector having the electrically-conductive cover connected thereto in a unitary manner is fitted on a plug of the discharge bulb, the electrically-conductive cover is automatically contacted with the contact terminal portion electrically connected to the electrically-conductive film on the reflector, thereby effecting the electrical connection between the two. Therefore, the discharge bulb and its plug are covered with the electrically-conductive cover, thus providing the shield structure. Therefore, there is no need to prepare any separate shield part or member, and the radiation of electromagnetic waves from the discharge bulb is prevented. Moreover, the number of the component parts is reduced, and also the assembling operation is simplified.

DETAILED DESCRIPTION OF THE PREFERRED EMBODIMENT

Figure 1:
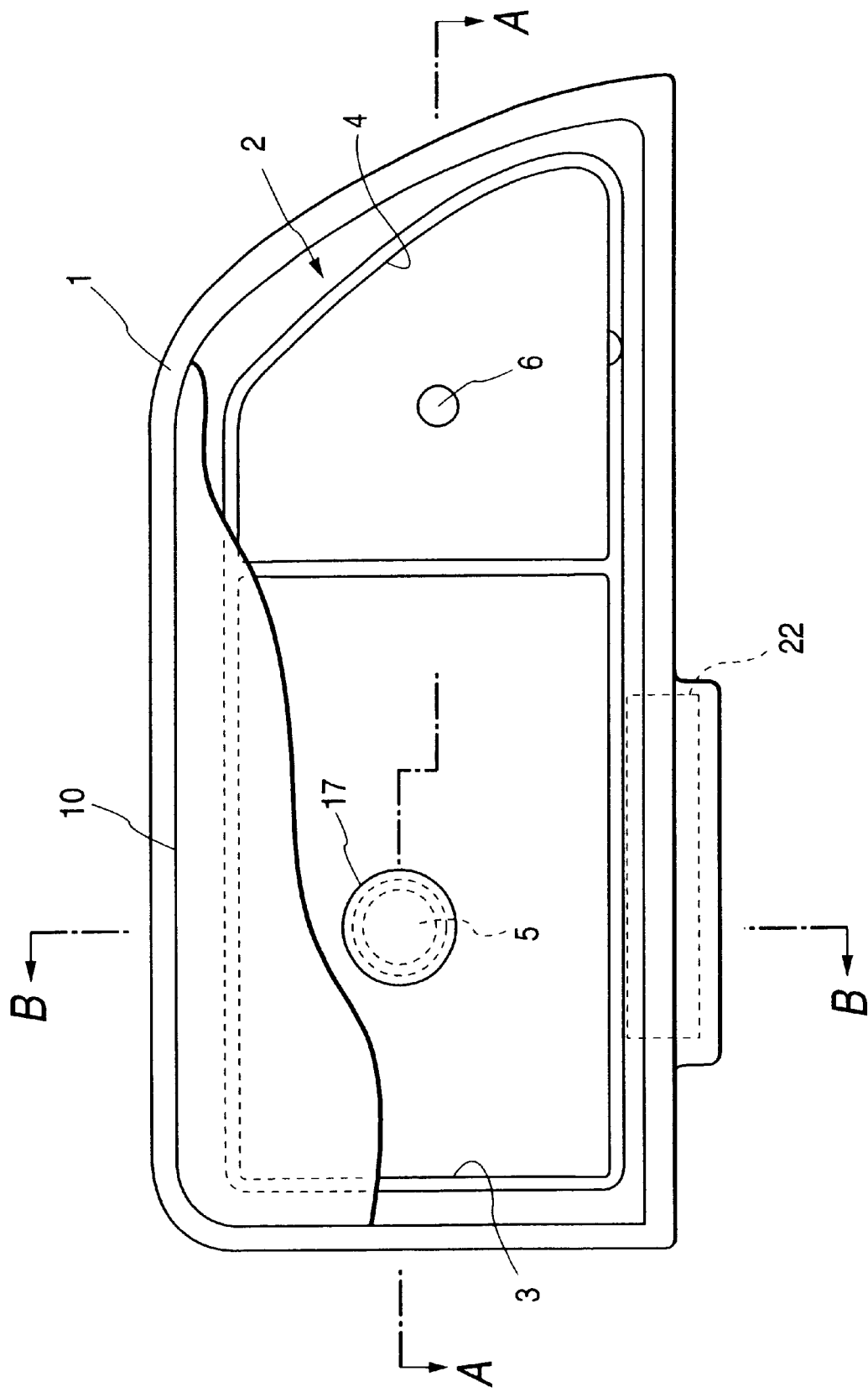
FIG. 1 is a front-elevational view of one preferred embodiment of a head lamp of the present invention.
Figure 2:
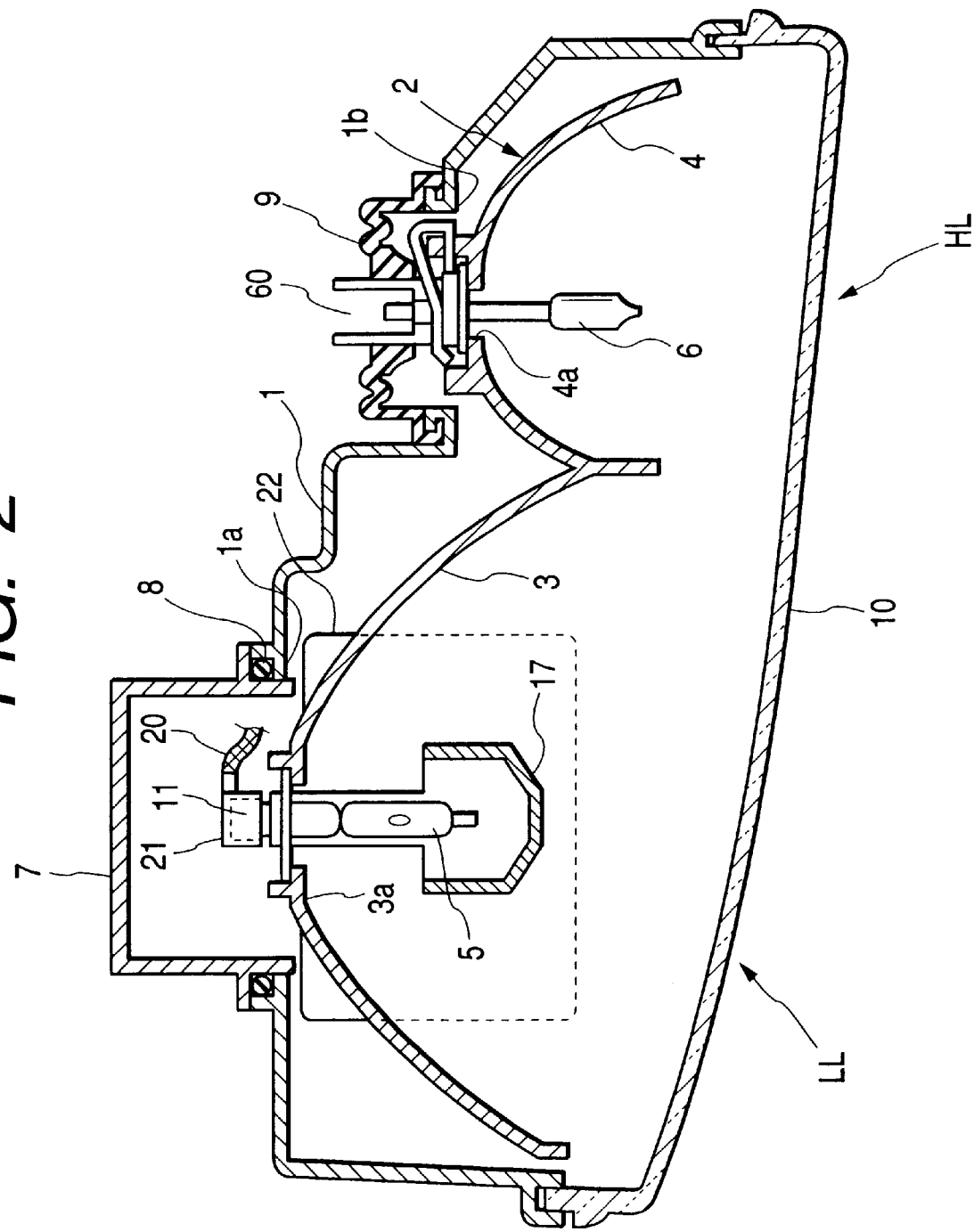
FIG. 2 is a cross-sectional view taken along the line A—A of FIG. 1.
Figure 3:
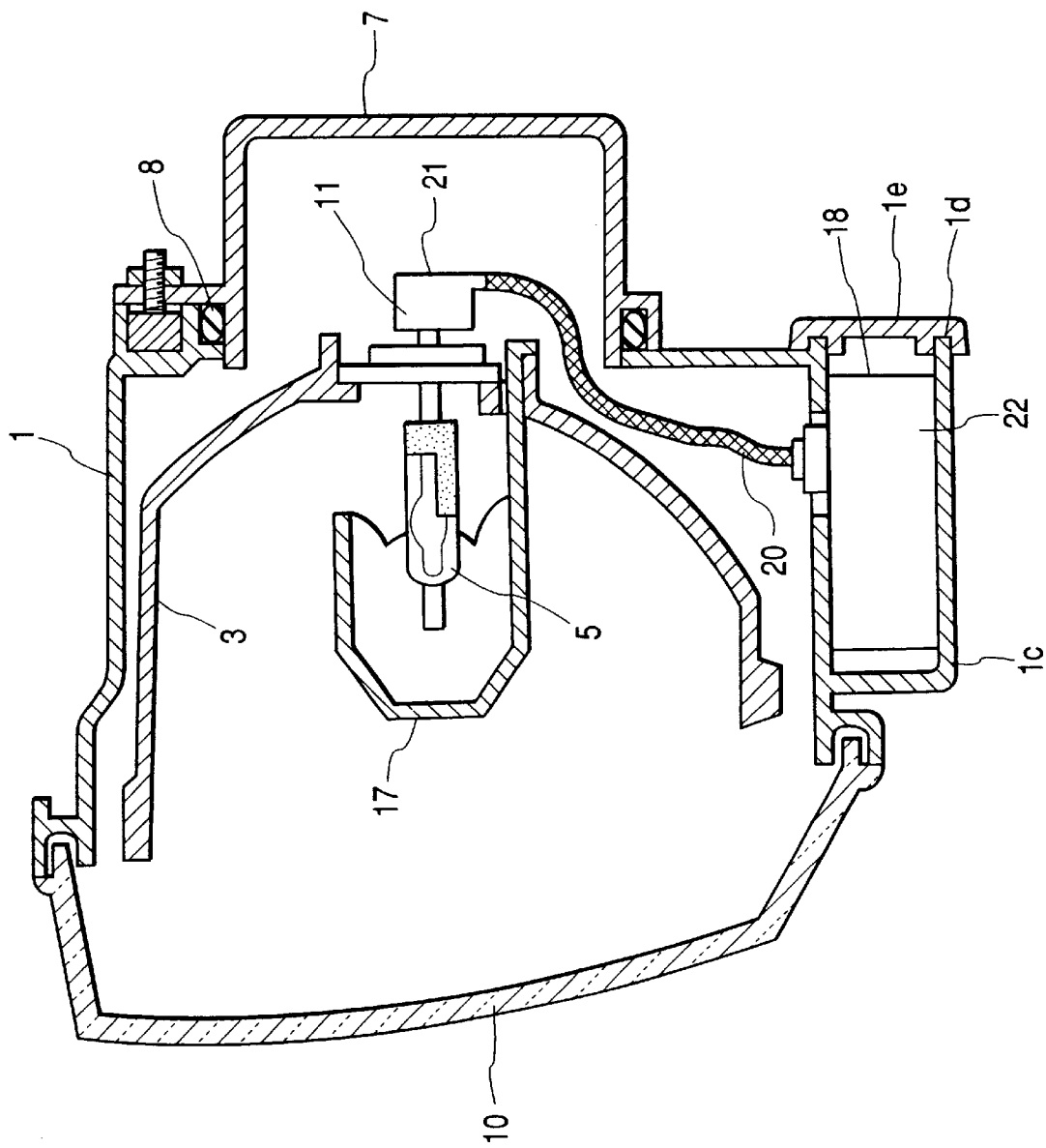
FIG. 3 is a cross-sectional view taken along the line B—B of FIG. 1.

A preferred embodiment of the present invention will now be described with reference to the drawings. FIG. 1 is a partly-broken, front-elevational view of one preferred embodiment of a lamp of the present invention used in an automobile having a four-lamp head lamp system, FIG. 2 is a cross-sectional view taken along the line A—A of FIG. 1, and FIG. 3 is a cross-sectional view taken along the line B—B of FIG. 1. In these Figures, a reflector 2 of an integral construction is mounted within a lamp body 1, and this reflector 2 has two reflectors 3 and 4 of a paraboloidal shape integrally formed with each other in a juxtaposed manner. When this lamp is mounted on an automobile, the reflector 3 is disposed adjacent to the outer side of an car body while the reflector 4 is disposed inwardly of the reflector 3. A discharge bulb 5 is detachably mounted on the reflector 3 for a low beam lamp LL while a halogen lamp 6 is detachably mounted on the reflector 4 for a high beam lamp HL. The bulb 5 is mounted in a bulb mounting hole 3a formed through a rear portion of the reflector 3, and the bulb 6 is mounted in a bulb mounting hole 4a formed through a rear portion of the reflector 4.

An opening 1a for inserting a bulb are formed through that portion of a rear portion of the lamp body 1 facing the bulb 5, and an opening 1b for inserting a bulb is formed through that portion of the rear portion of the lamp body 1 facing the bulb 6. The bulbs 5 and 6 can be attached to and detached from the lamp body through the respective openings 1a and 1b. A back cover 7 is mounted on the lamp body 1 through a seal ring 8 to cover the opening 1a in the low beam lamp (LL) side, and a rubber cover 9 is mounted on the lamp body 1 to cover the opening 1b in the high beam lamp (HL) side. Thus, the openings 1a and 1b are sealed in a waterproof manner by these covers 7 and 8, respectively. A connector 11, more fully described later, is connected to a plug 50 of the low beam lamp (LL) discharge bulb 5, and a socket connector 60 of the high beam lamp (HL) halogen lamp 6 projects outwardly from the rubber cover 9, and is connected to a connector (not shown). Although not shown in the drawings, an electrically-conductive film of aluminum or the like is formed on an inner surface of the back cover 7 by coating or vapor deposition, and this film serves also as a shield film for electromagnetically shielding the interior of the lamp body 1. A lens 10 is mounted on the open front side of the lamp body 1, and lighting chambers for the low beam lamp LL and high beam lamp HL are formed within the lamp body 1.

Figure 4:
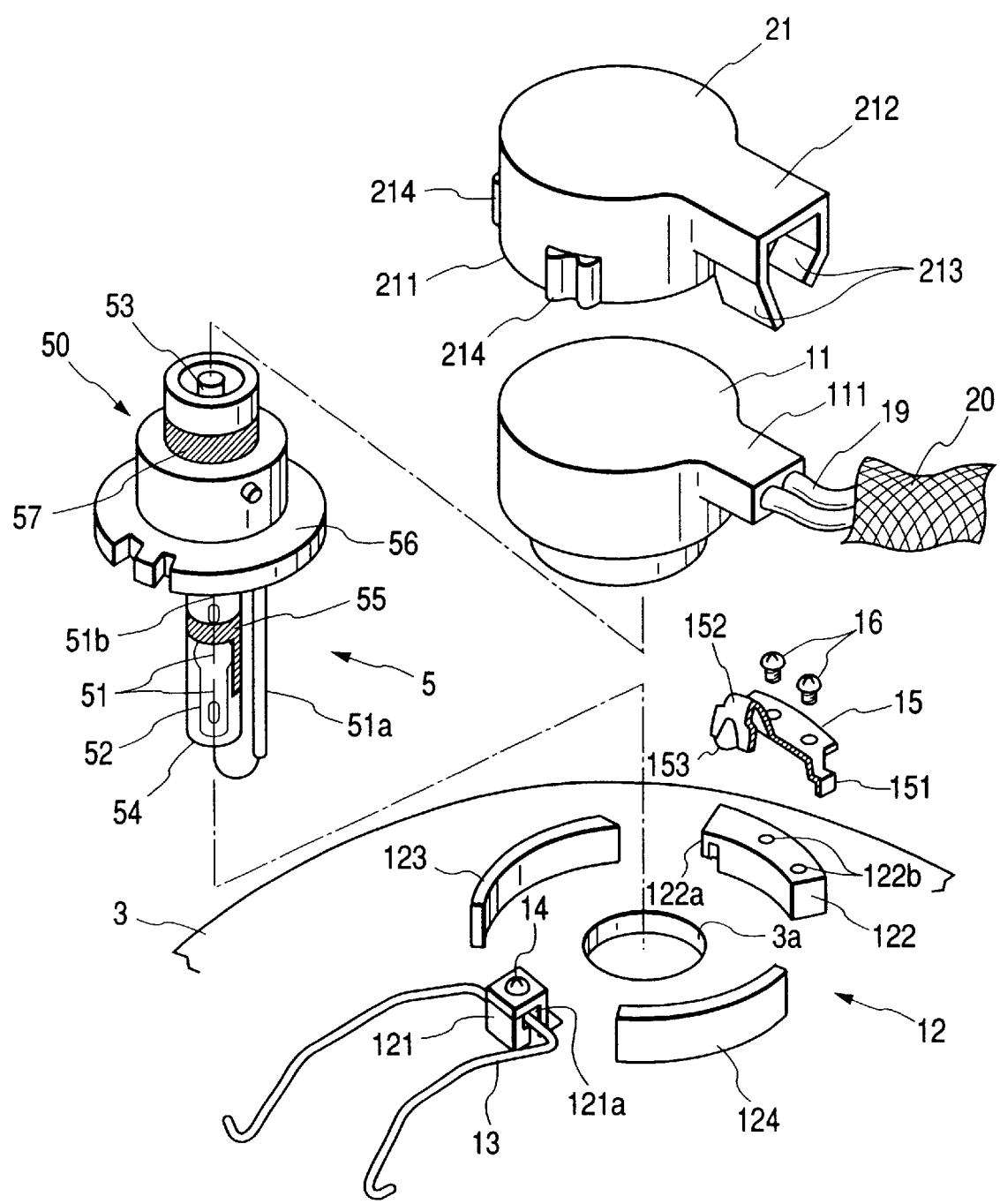
FIG. 4 is an exploded perspective view showing a portion of a rear side of a reflector having an opening.
Figure 5:
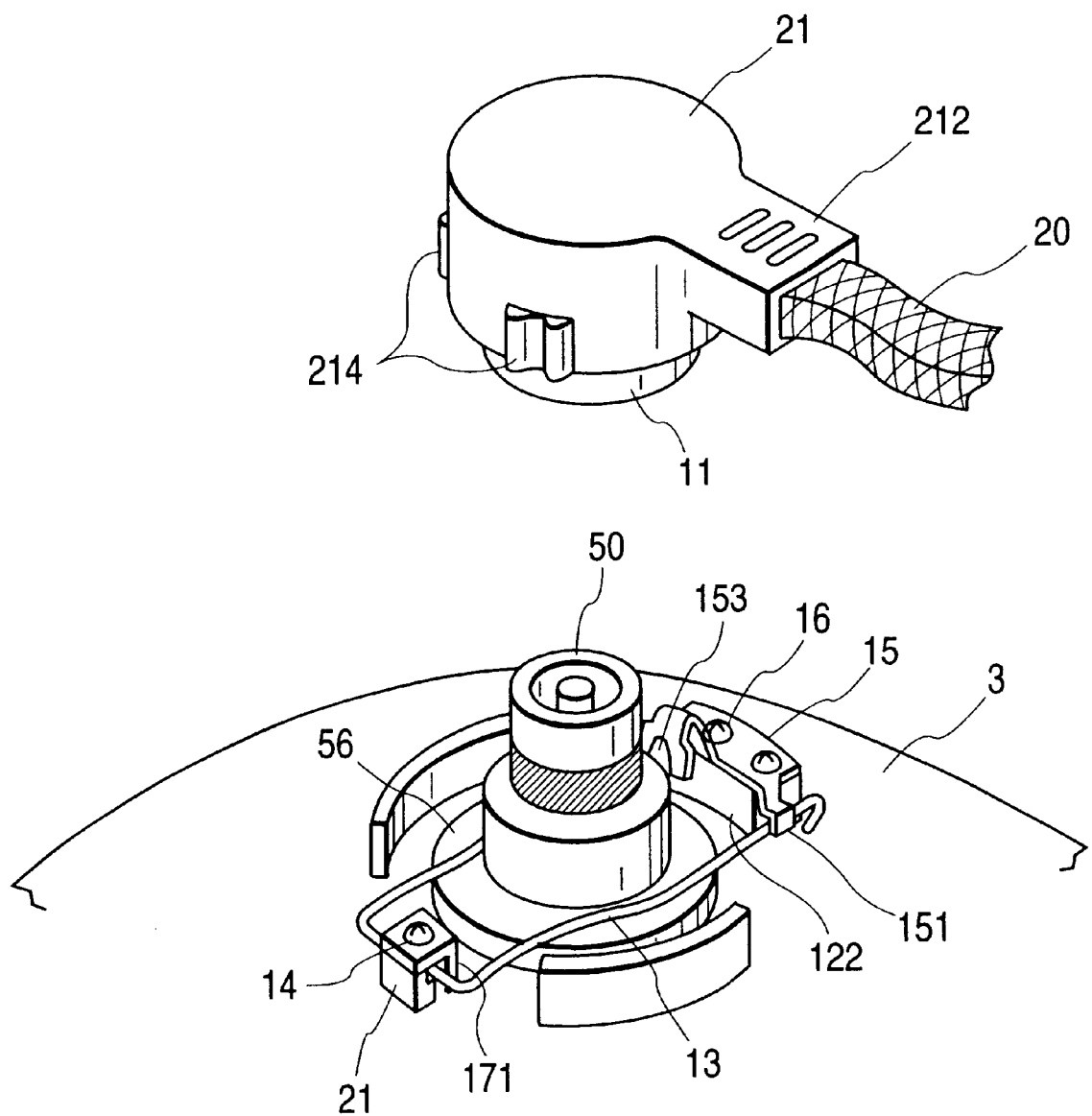
FIG. 5 is a perspective view showing a partly-assembled condition of the structure shown in FIG. 4.
Figure 6:
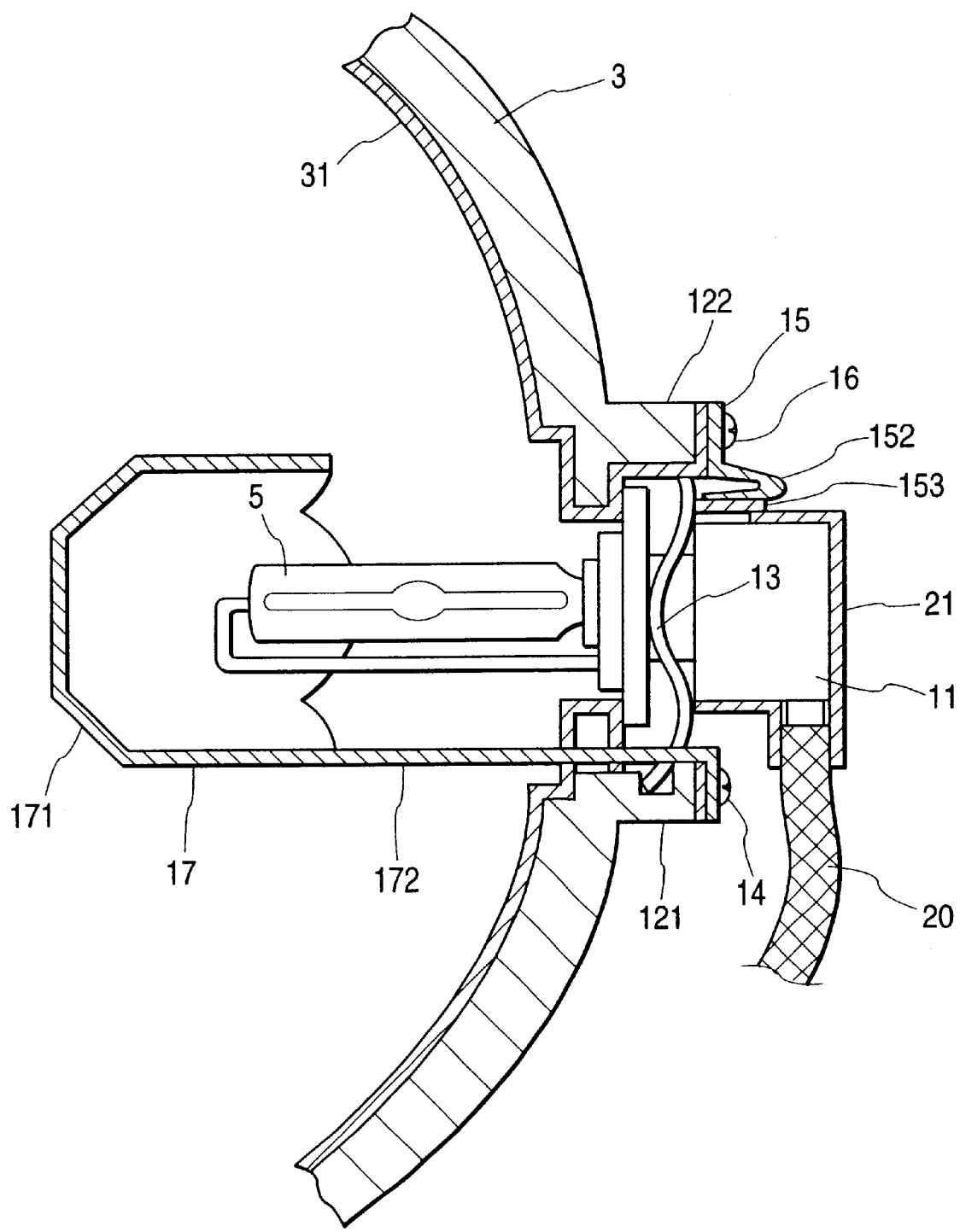
FIG. 6 is a cross-sectional view of the structure shown in FIG. 5.

FIG. 4 is an exploded perspective view showing the rear side of the reflector 3 and the associated parts, FIG. 5 is a perspective view showing a partly-assembled condition of the structure of FIG. 4, and FIG. 6 is a cross-sectional view of the structure of FIG. 5. As shown in these Figures, a peripheral wall 12 is formed integrally on the rear surface of the reflector 3 on which the discharge bulb 5 is mounted in surrounding relation to the bulb mounting hole 3a, and a retainer spring 13 (described later) is retained on this peripheral wall 12. The peripheral wall 12 is circumferentially divided into a plurality of (four in this embodiment) sections, and the peripheral wall (hereinafter referred to as "short peripheral wall") 121, having the smallest length in the circumferential direction among the four peripheral walls, has a downwardly-directed hook 121a formed on an inner surface thereof. A distal end of a stem 172 of a shade 17, extending through the reflector 3, is fixedly secured to an upper surface of the peripheral wall 121 by a screw 14. The relatively-long peripheral wall (hereinafter referred to as "long peripheral wall") 122, disposed in diametrically opposite relation to the short peripheral wall 121, has a downwardly-directed hook 122a formed at one end thereof in the circumferential direction, and a pair of screw holes 122b are formed in an upper surface thereof. The other two peripheral walls 123 and 124 serve to guide the periphery of the plug 50 (more fully described later) of the discharge bulb 5. An electrically-conductive film 31 of aluminum or the like is formed on the inner surface of the reflector 3 and the surface of the peripheral wall 12 by coating or vapor deposition (see FIG. 6), and this electrically-conductive film 31 forms a reflecting surface for reflecting light emitted from the discharge bulb 5, and also forms a shield film over the inner surface of the reflector 3 and the surface of the peripheral wall 12.

A fixture 15 is fixedly secured to the long peripheral wall 122 by screws 16. This fixture 15 is formed by a metal sheet of a resilient spring nature, and a hook 151 is formed at one end of the fixture 15, and when the fixture 15 is fixedly secured to the long peripheral wall 122, this hook 151 projects beyond the other end of the long peripheral wall 122, and is directed downwardly. The other end portion of the fixture 15 is disposed intermediate the opposite ends of the long peripheral wall 122 in the circumferential direction, and a strip-like portion 152 extends from this end portion in the radial direction. This strip-like portion 152 is bent into a generally L-shape in a thickness direction, and a contact terminal portion 153 of a convex shape is formed at the distal end of the strip-like portion 152, and is disposed adjacent to the bulb mounting hole 3a.

The retainer spring 13 comprises a wire spring formed into a generally U-shape, and a central portion of this retainer spring 13 is engaged with the hook 121a of the short peripheral wall 121. One of two legs of the retainer spring 13 is retainingly engaged at its distal end with the hook 122a formed at the one end of the long peripheral wall 122. Similarly, the other leg of the retainer spring 13 is retainingly engaged at its distal end with the hook 151 formed on the fixture 15.

As shown in FIG. 4, the discharge bulb 5 includes an arc tube 52 extending perpendicularly from the front side of the cylindrical plug 50, and this arc tube 52 has a pair of electrodes 51. One of the electrodes is electrically connected to an external support 51a extending in the outer side of the arc tube 52, and the other electrode is electrically connected to an internal support 51b extending to a rear end surface of the plug 50 along the axis of the arc tube 52. The external support 51a and the internal support 51b are electrically connected respectively to a central terminal portion 53 provided at the rear portion of the plug 50 and an annular terminal portion 57 formed on the outer peripheral surface of the plug 50. The central terminal portion 53 and the annular terminal portion 57 serve as feeder terminals of the discharge bulb 5. The arc tube 52 is enclosed in a transparent shroud 54 of a cylindrical shape, and a light-intercepting coating 55 is applied to part of the shroud 54, thereby limiting a light-emitting area of the arc tube 52. A plug flange 56 of a larger diameter is formed integrally on the front side of the plug 50.

In a condition in which the discharge bulb 5 is mounted on the reflector 3, the shade 17 made of a metal material is disposed at the front side of the discharge bulb 5, and the stem is formed integrally with and extends straight backwardly from a lower portion of a shield portion 171 of the metal shade 17 toward the rear side of the lamp. The distal end portion of the stem 172 passes from the front side of the reflector 3 through the bulb mounting hole 3a in contiguous relation to part of the peripheral edge of this hole 3a, and is fixedly secured to the short peripheral wall 121 by the screw 14.

Figure 7:
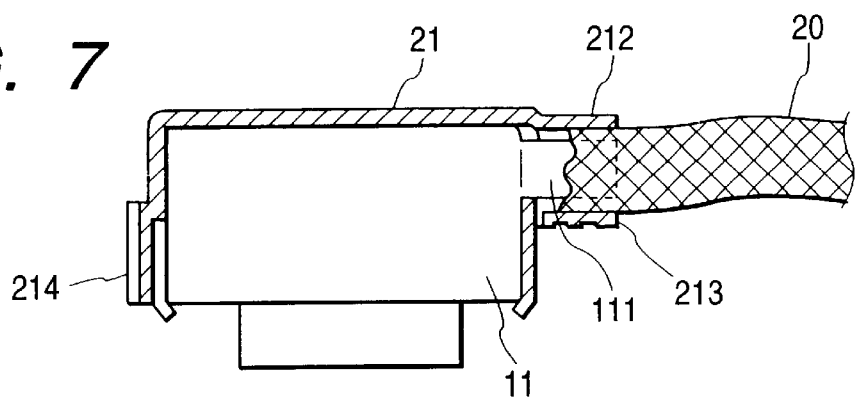
FIG. 7 is a cross-sectional view showing a metal cover fitted on a connector.

A high-voltage cord 19 extending from a lighting circuit 18 is connected to the connector 11 to be fitted on the plug 50 of the discharge bulb 5, and when the connector 11 is fitted on the plug 50, this connector is electrically connected to the feeder terminal 53 of the discharge bulb 5 to apply a high voltage to the discharge bulb. The high-voltage cord 19 is passed through a shield tube 20 in the form of a tubular metal net for shielding purposes. The connector 11 is covered with a metal cover 21 made of a metal material. As shown in FIG. 7, which shows the cross-section of the metal cover 21, this metal cover 21 is first fitted on the connector 11 from the rear side thereof, and then a peripheral edge of an open side of the metal cover 21 is slightly bent inwardly at a peripheral portion of the front side of the connector 11, thereby connecting the metal cover 21 to the connector 11 in a unitary manner. A sleeve 212 of a square tubular shape is formed integrally on an outer peripheral surface of the metal cover 21, and clamping piece portions 213 extending from this sleeve 212 are pressed to embrace the high-voltage cord 19 and the shield tube 20, and by doing so, an end portion of the shield tube 20 is held between the sleeve 212 and a cord lead-out portion 111 of the connector 11, and also the shield tube 20 is electrically connected to the metal cover 21. A plurality of contact portions 214 (three in this embodiment) are formed on the outer peripheral surface of the metal cover 21, and are spaced from one another in the circumferential direction. Each of the contact portions 214 has a generally M-shape, and has two projections which are spaced with a very small distance form each other in the circumferential direction, and project radially from the outer peripheral surface of the metal cover 21.

The lighting circuit 18, which is connected to the other end of the high-voltage cord 19 so as to supply a high voltage to the discharge bulb 5, is contained in a metal casing 22 as shown in FIG. 3, and this lighting circuit casing 22 is housed in a compartment 1c formed at a bottom portion of the lamp body 1. This compartment 1c has an opening 1d which is open to the exterior of the lamp body 1, and the lighting circuit casing 22 is inserted into the lamp body 1 from the exterior through this opening 2d, and is mounted therein.

In the above lamp, the discharge bulb 5 is passed through the bulb mounting hole 3a from the rear side of the reflector 3, and the flange 56 of the plug 50 of the discharge bulb is held against the rear surface of the reflector 3. Then, the distal ends of the two legs of the retainer spring 13, engaged with the hook 121a of the short peripheral wall 121, are retainingly engaged respectively with the hook 122a of the long peripheral wall 122 and the hook 151 of the fixture 15, and as a result the two legs are resiliently pressed against the rear surface of the flange 56, so that the plug 50 is resiliently held against the rear surface of the reflector 3 by this resilient pressing force, thereby fixing and supporting the discharge bulb 5 relative to the reflector 3. With this fixing and supporting structure for the discharge bulb 5, the grounding electrode 57 formed on the plug 50 of the discharge bulb 5 is electrically connected to the electrically-conductive film 31 on the reflector 3, and is also electrically connected to the fixture 15 through the retainer spring 13 and the hook 151.

Figure 8A:
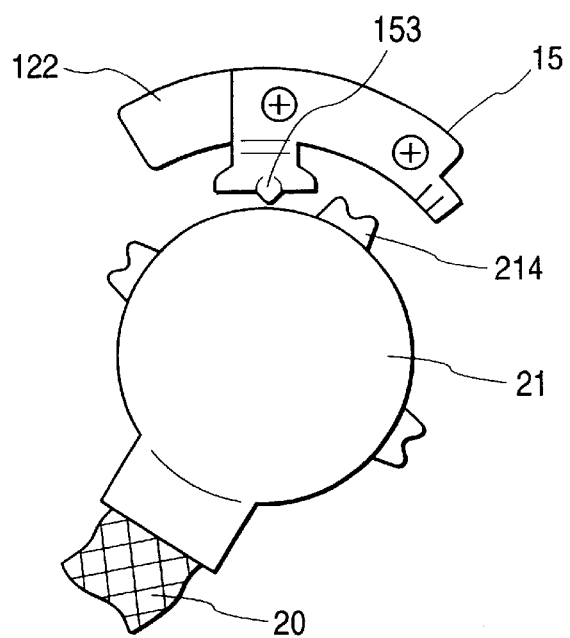
FIGS. 8A and 8B are rear views explaining an operation for attaching the connector to a plug.
Figure 8B:
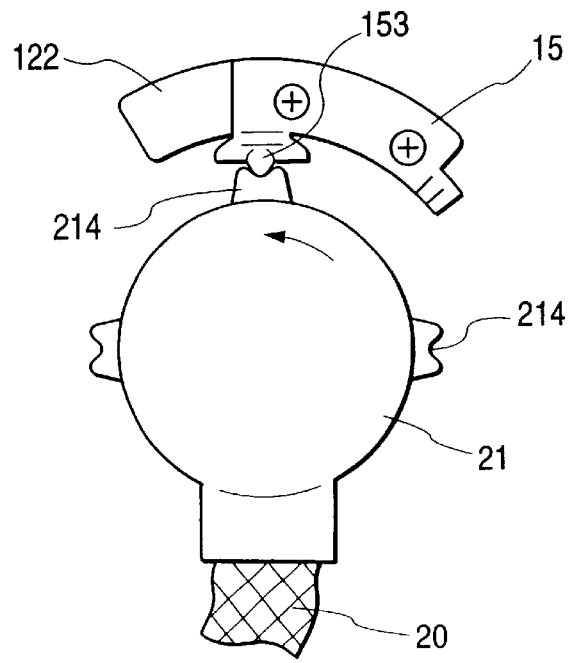

Then, the connector 11 is fitted on and attached to the plug 50 of the discharge bulb 5. This attaching operation is effected by a conventional fitting method in which the connector 11 is fitted on the plug 50 just from the rear side thereof, and is rotated (angularly moved) about the axis thereof to be connected to the plug 50 in a unitary manner. In this case, when the connector 11 is rotated about the axis thereof, any one of the plurality of contact portions 214 formed on the outer peripheral surface of the metal cover 21 never fails to be brought into contact with the contact terminal portion 153 of the fixture 15, as shown in FIGS. 8A and 8B which are a rear view. In this case, in accordance with the rotation of the connector 11, the contact terminal portion 153, while resiliently deformed, slides over the very small projection of the contact portion 214 and is brought into resilient contact with a recess portion between the two projections, and therefore this contacted condition is stable. As a result, the metal cover 21 is electrically connected to the fixture 15.

In the above assembled lamp, the lighting circuit 18 is shielded by the lighting circuit casing 22 made of metal, and therefore electromagnetic waves from the lighting circuit 18 will not be radiated to the exterior. The high-voltage cord 19 extending from the lighting circuit casing 22 to the discharge bulb 5 is shielded by the shield tube 20, and therefore the radiation of electromagnetic waves from this cord 19 is prevented. With respect to the discharge bulb 5, the connector 11 fitted on the plug 50 is covered with and shielded by the metal cover 21, and therefore the radiation of electromagnetic waves from the plug 50 and the connector 11 is prevented by the metal cover 21. The periphery of the discharge bulb 5 is covered with the electrically-conductive film 31 formed on the reflector 3, and besides the metal shade 17 is provided at the front side of the discharge bulb 5, so that the front side of the discharge bulb 5 is covered with this shade. The metal shade 17, the electrically-conductive film 31 formed on the inner surface of the reflector 3, and the grounding electrode 57 of the plug of the discharge bulb 5 are electrically connected to the fixture 15 through the retainer spring 13, and are further electrically connected to the metal cover 21 and the shield tube 20 through this fixture 15, and are electrically connected to a grounding circuit (not shown) of the lighting circuit 18. Therefore, the electrically-conductive film surrounding the discharge bulb 5 and the plug 50 is kept at the grounding potential, and therefore the radiation of electromagnetic waves from the discharge bulb 5 to the exterior of the lamp is suppressed by this shielding effect.

In the above lamp, the connector 11 is covered with the metal cover 21, and is connected thereto in a unitary manner, and therefore the connector 11 and the metal cover 21 can be combined together to provide a sub-assembly, and therefore the number of the component parts of the lamp can be reduced, and particularly the lamp-assembling operation can be simplified. Moreover, when the connector 11 is fitted on the plug 50 of the discharge bulb 5, the metal cover 21 connected to the connector 11 in a unitary manner can be automatically electrically connected to the fixture 15, and therefore there is no need to provide any part or member for electrically connecting the two together, and hence there is no need to effect any operation for electrically connecting the two together, and therefore the number of the component parts can be further reduced, and also the assembling operation can be further simplified. Particularly with respect to the assembling operation to be effected in a small space within the lamp body 1, it is only necessary to fit the connector 11 on the plug, and therefore the efficiency of the lamp-assembling operation can be markedly enhanced. Furthermore, the plurality of contact portions 214 are formed on the metal cover 21, and are spaced from one another in the circumferential direction, and therefore even if the connector 11 is fitted on the plug 50 in any direction, any one of the contact portions 214 never fails to be contacted with the contact terminal portion 153, thus effecting the electrical connection between the two.

In the above embodiment, the shield tube 20 shielding the high-voltage cord 19 is electrically connected to the metal cover 21 by pressing the clamping piece portions, and therefore the assembling operation of the shield structure at this portion can be simplified. The lighting circuit 18 is housed in the lamp body 1, and therefore the high-voltage cord 19 is not exposed to the exterior of the lamp body, and therefore the safety is improved, and the appearance of the lamp is improved, and the lamp can be easily handled. Therefore, the efficiency of the operation for mounting the lamp on the car body of the automobile can be improved.

Although the above embodiment of the present invention is directed to the lamp for use in a four-lamp head lamp system of an automobile, the invention can be applied to any other suitable vehicle lamp for use in a two-lamp head lamp system or a fog lamp system in so far as a discharge bulb is used as a light source. The present invention can also be applied to a lamp with a projection-type lamp using a discharge bulb as a light source.

As described above, in the present invention, the connector to be fitted on the plug of the discharge bulb is covered with the electrically-conductive cover, and is connected thereto in a unitary manner, and therefore the connector and the electrically-conductive cover can be combined together to provide a sub-assembly, and therefore the number of the component parts of the lamp can be reduced, and particularly the lamp-assembling operation can be simplified. Moreover, when the connector is fitted on the discharge bulb, the electrically-conductive cover connected to the connector in a unitary manner can be automatically electrically connected to the electrically-conductive film on the reflector to provide the shield structure, and therefore there is no need to provide any part or member for electrically connecting the two together, and hence there is no need to effect any operation for electrically connecting the two together, and therefore the number of the component parts can be further reduced, and also the assembling operation can be further simplified. Furthermore, the plurality of contact portions are formed on the electrically-conductive cover, and are spaced from one another in the circumferential direction, and therefore even if the connector is fitted on the plug at any position in the circumferential direction, any one of the contact portions never fails to be contacted with the contact terminal portion, thus effecting the electrical connection between the two. Therefore, in the present invention, there can be obtained the lamp in which the number of the component parts is reduced, and the assembling operation is simplified, and the radiation of electromagnetic waves from the discharge bulb is suppressed.

The present invention is based on Japanese Patent Application No. Hei. 11-45396 which is incorporated herein by reference.

What is claimed is:

1. A vehicle lamp comprising:
a reflector including an electrically-conductive film on a surface of said reflector and a contact terminal portion electrically connected to the electrically-conductive film;
a discharge bulb supported in said reflector;
a connector detachably connected to said discharge bulb; and
an electrically-conductive cover covering said connector,
wherein said electrically-conductive cover is in contact with the contact terminal portion of said reflector when said connector is connected to said discharge bulb,
wherein said reflector further includes a bulb mounting hole in which said discharge bulb is inserted and a peripheral wall portion surrounding the bulb mounting hole, and said connector is connected to said discharge bulb being surrounded by the peripheral wall portion, and the contact terminal portion of said reflector is provided on the peripheral wall portion of said reflector and includes an elastic conductive member elastically contacting with the surface of said electrically-conductive cover, and
wherein said connector is detachably connected to said discharge bulb by rotating said connector relative to said discharge bulb, and said electrically-conductive cover includes a plurality of contacting portions provided in a rotating direction of said connector, and one of the contacting portions is in contact with the contact terminal portion of said reflector.

2. The vehicle lamp according to claim 1, wherein said connector is detachably connected to said discharge bulb by rotating said connector relative to said discharge bulb.

3. The vehicle lamp according to claim 2, wherein the one of the contacting portions of said electrically-conductive cover is formed in an M-shape.

4. The vehicle lamp according to claim 1, wherein a retainer spring is provided in the peripheral wall portion of said reflector and resiliently holds said discharge bulb against the rear surface of said reflector.

5. The vehicle lamp according to claim 1, wherein said electrically-conductive cover is fit to said connector by bending a part of said electrically-conductive cover at the front peripheral portion of said connector.

6. A vehicle lamp unit comprising:
a lamp body including a compartment;
a reflector provided in said lamp body and including an electrically-conductive film on a surface of said reflector and a contact terminal portion electrically connected to the electrically-conductive film;
a discharge bulb supported in said reflector;
a connector detachably connected to said discharge bulb;
an electrically-conductive cover covering said connector; and
a lighting circuit enclosed in a metal case and provided in the compartment of said lamp body;
a cord encased in a metal shield tube and electrically connecting said discharge bulb with said lighting circuit,
wherein said electrically-conductive cover is in contact with the contact terminal portion of said reflector when said connector is connected to said discharge bulb,
wherein said reflector further includes a bulb mounting hole into which said discharge bulb is inserted and a peripheral wall portion surrounding the bulb mounting hole, and said connector is connected to said discharge bulb being surrounded by the peripheral wall portion, and the contact terminal portion of said reflector is provided on the peripheral wall portion of said reflector and includes an elastic conductive member elastically contacting with the surface of said electrically-conductive cover, and wherein said connector is detachably connected to said discharge bulb by rotating said connector relative to said discharge bulb, and said electrically-conductive cover includes a plurality of contacting portions provided in a rotating direction of said connector, and one of the contacting portions is in contact with the contact terminal portion of said reflector.

7. The vehicle lamp unit according to claim 6, wherein said connector is detachably connected to said discharge bulb by rotating said connector relative to said discharge bulb.

8. The vehicle lamp unit according to claim 7, wherein the contacting portion of said electrically-conductive cover is formed in an M-shape.

9. The vehicle lamp unit according to claim 6, wherein a retainer spring is provided in the peripheral wall portion of said reflector and resiliently holds said discharge bulb against the rear surface of said reflector.

10. The vehicle lamp unit according to claim 6, wherein said electrically-conductive cover is fit to said connector by bending a part of said electrically-conductive cover at the front peripheral portion of said connector.

* * * * *